United States Patent
Stellema et al.

(10) Patent No.: US 8,075,766 B2
(45) Date of Patent: Dec. 13, 2011

(54) LIQUID FILTRATION SYSTEM

(75) Inventors: Terry Stellema, Holt, MO (US);
Humphrey Blackburn, Custer, WA (US); Brian Parris, Mission, KS (US); Matthew D. Silvey, Flower Mound, TX (US)

(73) Assignees: CST Industries, Inc., Kansas City, KS (US); Blue Future Filters, Inc., Bellingham, WA (US)

( * ) Notice: Subject to any disclaimer, the term of this patent is extended or adjusted under 35 U.S.C. 154(b) by 92 days.

(21) Appl. No.: 12/466,609

(22) Filed: May 15, 2009

(65) Prior Publication Data

US 2009/0294365 A1 Dec. 3, 2009

Related U.S. Application Data

(60) Provisional application No. 61/053,318, filed on May 15, 2008.

(51) Int. Cl.
*B01D 36/00* (2006.01)
*B01D 24/16* (2006.01)
*B01D 19/00* (2006.01)

(52) U.S. Cl. ........ 210/188; 210/202; 210/205; 210/218; 210/241; 210/266; 210/289; 96/187; 96/206; 96/219

(58) Field of Classification Search .................. 210/188, 210/202, 205, 218, 241, 266, 289; 96/206, 96/219
See application file for complete search history.

(56) References Cited

U.S. PATENT DOCUMENTS

| | | | | |
|---|---|---|---|---|
| 2,445,669 A | * | 7/1948 | Goetz | 210/665 |
| 3,203,894 A | * | 8/1965 | Ikuno | 210/667 |
| 3,649,532 A | * | 3/1972 | McLean | 210/718 |
| 4,447,330 A | * | 5/1984 | Babineaux, III | 210/717 |
| 4,518,403 A | * | 5/1985 | Hertz | 96/206 |
| 4,969,996 A | | 11/1990 | Hankammer | |
| 5,069,796 A | * | 12/1991 | Fox | 210/664 |
| 5,547,586 A | * | 8/1996 | Halperin et al. | 210/686 |
| 5,788,843 A | * | 8/1998 | Larrabee et al. | 210/620 |
| 5,997,737 A | * | 12/1999 | Sturdevant et al. | 210/170.11 |
| 7,273,555 B2 | | 9/2007 | Dennis | |
| 2005/0098499 A1 | * | 5/2005 | Hussain | 210/639 |
| 2005/0109705 A1 | | 5/2005 | Webb | |
| 2005/0115906 A1 | | 6/2005 | Shay | |
| 2005/0173314 A1 | | 8/2005 | Drake | |
| 2009/0204419 A1 | * | 8/2009 | Stewart | 705/1 |

FOREIGN PATENT DOCUMENTS

| | | |
|---|---|---|
| CA | 1331346 | 8/1994 |
| DE | 3810441 A1 | 10/1989 |
| JP | 2002332842 | 11/2002 |

OTHER PUBLICATIONS

Multi-Stage Filter Package Plants for Small Drinking Water Applications, Jul. 2009, MS Filter Systems Inc.

* cited by examiner

*Primary Examiner* — Matthew Savage
(74) *Attorney, Agent, or Firm* — Husch Blackwell LLP (57) ABSTRACT

A water treatment method is provided for helping to partially or completely remove sodium and methane gas from water. In the method, water is combined with a reactant that is formulated to combine with the sodium in the water and form a compound. The water and compound are then passed through a bed of media for helping to separate the compound from the water. The method also includes aerating the water to release gases contained therein by breaking the water into microdroplets by passing it through a screen. Additionally, the method may include a step wherein the water is passed through an acidic resin for facilitating a cation exchange where additional sodium is removed. A water treatment apparatus for performing the method is also provided.

7 Claims, 9 Drawing Sheets

LIQUID FILTRATION SYSTEM

CROSS-REFERENCE TO RELATED APPLICATIONS

This application is a nonprovisional of and claims priority to U.S. Provisional Application Ser. No. 61/053,318, filed May 15, 2008, the entire disclosure of which is incorporated herein by reference to the extent permitted by applicable law.

BACKGROUND OF THE INVENTION

Water containing elevated levels of sodium is often unsuitable for useful applications, such as the irrigation of plants, the consumption by animals, and the consumption by humans. Such water can pose major environmental concerns. Discharging water having high sodium content into streams, rivers, ponds, wetlands and the like can have adverse impacts on the surrounding land, vegetation and animals. Because of these impacts, there are regulations in place setting forth the limits on the quality of water that may be discharged.

One source of water that is rich in sodium is the coal bed methane (CBM) industry, which produces billions of gallons of such water each year as a byproduct of the process of extracting methane gas. Coal bed methane gas is found in coal seams beneath the earth's surface. The extraction of this methane gas from the underground coal seams requires the pumping of large quantities of water in order to release the pressure that holds the methane gas within the coal seams. In this extracting process, when the water pressure around the coal seams is reduced, the methane detaches from the coal and flows to a recovery well. Once to the surface, the methane gas is directed to pipelines and the water is left as a byproduct that must be dealt with.

The amount of water produced by a single CBM well can vary greatly from as little as one gallon per minute up to 100 gallons per minute. One study estimates that the typical CBM well produces an average of 10 gallons of water per minute over the course of its life. At that rate, the typical well will produce an average of 14,400 gallons of water per day throughout its life.

The relatively high concentration of sodium in CBM water can affect crop growth. When the level of sodium is high compared to the levels of magnesium and calcium, it can degrade the physical and chemical properties of the soil. Sodium can cause soil crusting, thereby affecting water availability and aeration, and can lead to dispersion and migration of clay particles. All of these factors have a negative impact on plant growth. Water is considered "sodic" when it contains high levels of sodium. Sodicity of water can be expressed as the Sodium Adsorption Ratio (SAR). The SAR is the relative amount of sodium in water compared to the amounts of calcium and magnesium and can be expressed as:

$$SAR = \frac{Na^+}{\sqrt{\frac{Ca^{2+} + Mg^{2+}}{2}}}$$

The USDA defines water having an SAR greater than 12 as sodic. Additionally, CBM water can also contain methane gas, iron, and manganese.

Accordingly, a need exists for an apparatus and method that allow water rich in sodium to be treated through the removal of at least a portion of the sodium. A need also exists for an apparatus and method that can remove methane gas from water. A further need exists for an apparatus and method that can economically and safely reduce water's SAR by reducing its sodium levels.

SUMMARY OF THE INVENTION

One embodiment of the present invention is directed to a method for helping to partially or completely remove sodium from a liquid wherein the liquid is combined with a reactant that is formulated to combine with the sodium in the water and form a compound. Once the compound is formed, the liquid is passed through a bed of media for separating the compound from the liquid. Upon passing through the bed of media, the liquid is discharged.

Another embodiment of the present invention is directed to a method for removing methane and other gases and sodium from a liquid. The liquid is first aerated to release the methane gas. This aeration can be accomplished by breaking the liquid into microdroplets by passing it through a screen. Either before or after the aeration, the liquid is combined with acetic acid or a magnesium compound suitable for combining with sodium and forming a compound. Once the compound is formed, the liquid and compound are then filtered through a media where the compound can be partly removed from the liquid. After the compound is partly removed from the liquid, the liquid is released.

A further embodiment of the present invention is directed to a liquid filtration system that includes first and second vessels. The first vessel is used to aerate the liquid and includes an inlet proximate its upper end that is in communication with a spray arm that distributes the liquid over a screen. In passing through the screen, the liquid is broken into microdroplets, allowing gas to be released. The first vessel is also in fluid communication with a source of a reactant formulated for helping to partially or completely remove sodium from a liquid through adsorption. The first vessel further includes an outlet proximate its lower end. The second vessel is used for filtering the flocs, particulates, and compounds from the liquid. The second vessel includes an inlet for receiving liquid from the first vessel's outlet and feeding the liquid into the second vessel proximate its lower end. The second vessel's inlet is in fluid communication with distribution pipe for dispersing liquid within the second vessel. The second vessel contains media for separating the compound from the liquid and an outlet for removing the treated liquid.

Other and further objects of the invention, together with the features of novelty appurtenant thereto, will appear in the course of the following description.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

One embodiment of the present invention is directed to a method for treating liquids, such as water. In particular, a principle object of the method is related to the removal of contaminants from water that can be harmful to the environment, animals, and plants. The method of the present invention can be used to treat the water pumped out of the ground during the coal bed methane gas extraction process. The method can also be used to treat water in municipal water treatment plants, industrial wastewater treatment systems, and can be used by non-profit relief agencies, militaries, third-world countries, and individuals in isolated areas.

Figure 1:
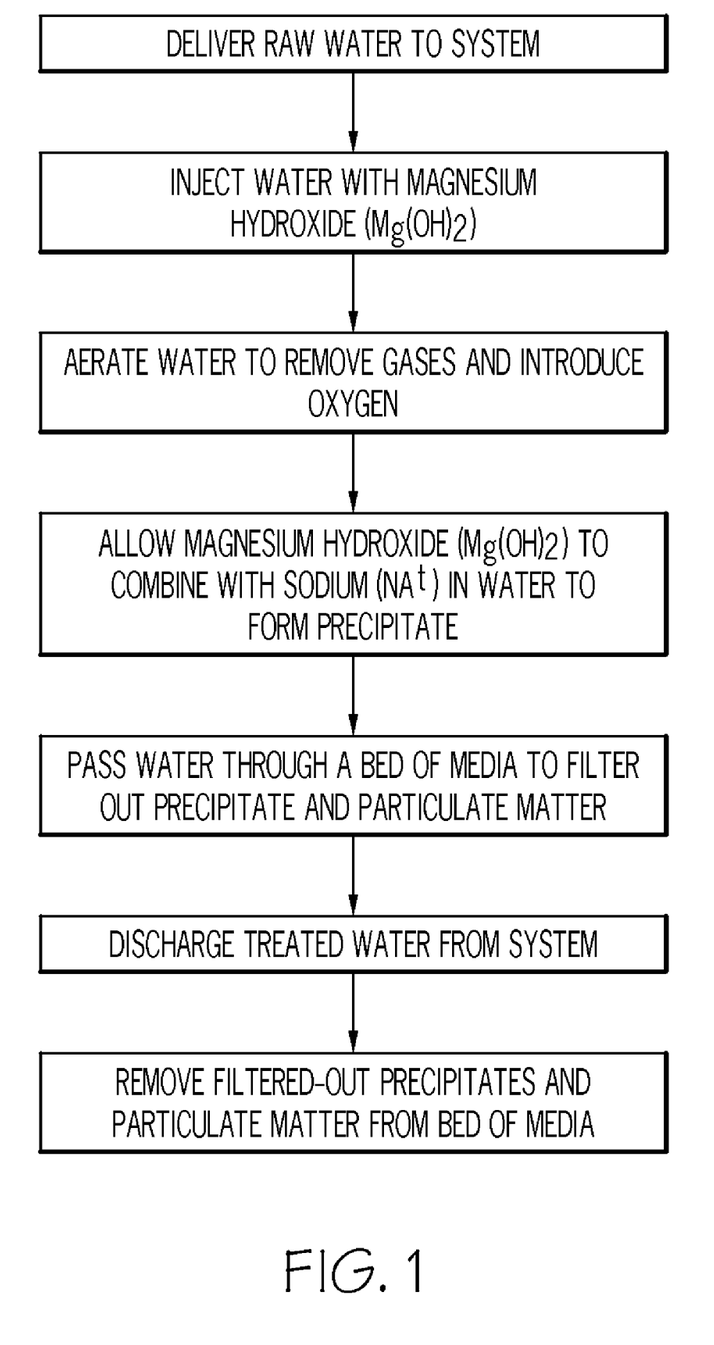
FIG. 1 is a block diagram illustration of the method for treating water using acetic acid in accordance with one embodiment of the present invention.
Figure 2:
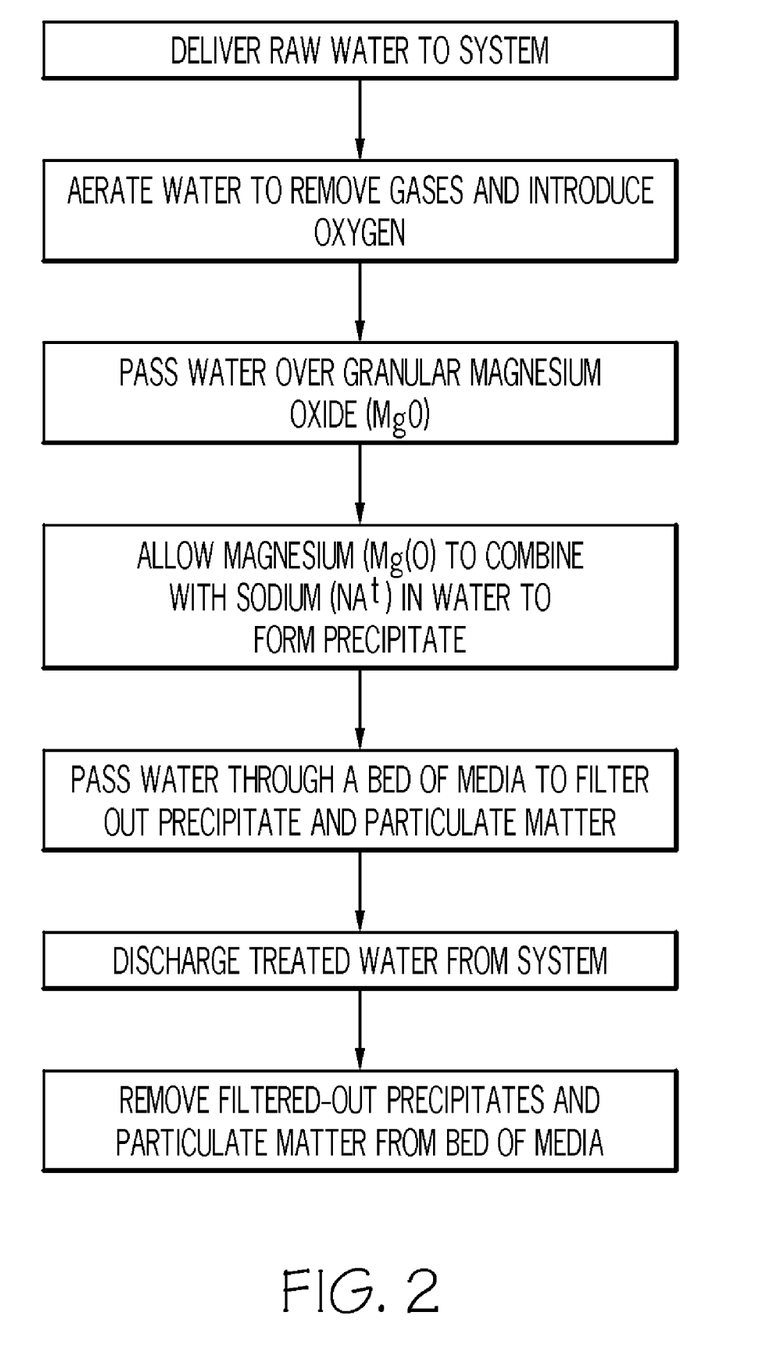
FIG. 2 is a block diagram illustration of the method for treating water using magnesium hydroxide or magnesium oxide in accordance with one embodiment of the present invention.

Referring now to the figures, FIG. 1 illustrates the steps involved for using acetic acid to help reduce the amount of sodium ($Na^+$) in water. FIG. 2 illustrates the steps involved for using magnesium hydroxide ($Mg(OH)_2$) or magnesium oxide (MgO) to do the same. These steps can reduce the amount of sodium, fluoride ($F^-$) and boron (B) in the water, as well as reduce the water's SAR. In performing the method, raw water is first delivered to the water treatment system 10. When the method is performed to treat CBM water, the step of delivering the raw water to the system is carried out by diverting the water pumped from the underground coal seams to the water treatment system 10.

Once the raw water is delivered to the system 10, it can be combined with a reactant that is formulated to help remove sodium from the water through adsorption. The reactant may be selected from a group consisting of acetic acid, magnesium hydroxide, magnesium oxide, magnesium sulfate ($MgSO_4$), gypsum ($CaSO_4.2H_2O$), lime (e.g. $Ca(OH)_2$), calcite ($CaCO_3$), and combinations thereof. The reactant may also include any other chemical suitable for combining with sodium to form a compound that is either now known or hereafter developed. The reactant may be in dry, liquid, slurry, chunk, or granular form. The use of a reactant containing magnesium can be beneficial if the raw water is magnesium deficient. Using magnesium hydroxide can be beneficial if the raw water has elevated levels of boron.

When a liquid reactant, such as acetic acid or magnesium hydroxide, is used to help remove sodium from the water, the reactant is directly injected, poured or sprayed into the water. Alternatively, when the reactant is in solid form, such as magnesium oxide, it may be located in a tray and the water may be cascaded over or sprayed onto the solid reactant.

Either prior or subsequent to the addition of the reactant, the water may be aerated in order to release gases contained within the water into the atmosphere and introduce oxygen into the water. Aeration is particularly desirable if the water is CBM water and contains elevated levels of methane gas. The aeration process may take place using of one or more of a variety of techniques. For example, in one embodiment the water is aerated by breaking it into microdroplets. The water is broken into microdroplets, for example, by cascading it through a screen having relatively small-sized openings. Alternatively, the water can be broken into microdroplets by injecting it through a pressurized nozzle. In another embodiment, the water is aerated through agitation by using a paddle, propeller, impeller or the like. Additionally, the water may be aerated by injecting it with air.

After the reactant has been introduced into the water, the mixture can be placed in a holding area for a period of time so that the reactant can combine with the sodium in the water and form a compound. The holding period can last between 15 and 45 minutes, depending upon conditions such as the temperature of the water, the amount of sodium in the water, and the amount of reactant introduced into the water. In order to accelerate the reaction and reduce the duration of the holding period, the water-reactant mixture may be heated.

Once the reactant has had adequate time to combine with the sodium in the water and has formed a compound, the water mixture and compound are passed though a media capable of filtering or sieving the compound from the water mixture. The media may either be in the form of a single sheet or in the form of a bed. The media can be selected from a group consisting of sand, gravel, clay, perlite, plastic manufactured beads and combinations thereof. Thus, the filtration process can be akin to that of a sand filter and can also be capable of filtering iron from the water.

When a bed of media is used, it may comprise media of varying sizes. In such an arrangement, the media may be layered according to size. When the water mixture and compound are flowed upwardly through the bed of media, the larger-sized media are placed towards the bottom of the bed and the smaller-sized media are placed towards the top of the bed. Thus, the size of the media and the void spaces therebetween become generally increasing smaller from bottom to top. However, in an embodiment where the water mixture and compound are flowed downwardly through the bed of media, the larger-sized media are placed towards the top of the bed and the smaller-sized media are placed towards the bottom of the bed.

Once the water has passed through the bed of media, it is discharged and can be used locally, piped to other areas, or released to flow downstream. The treated water can be used to irrigate crops or other vegetation, used to water livestock, released in streams, rivers, or reservoirs, or used for any other purpose for which such water is appropriate. It can also undergo further treatment (if necessary) to make it consumable by humans.

As time goes on, the media will slowly lose its filtering performance. At a certain point, as further discussed below, a cleaning cycle must eventually be initiated. In the cleaning cycle, the flow of the water mixture and compound through the media is ceased. After the flow has ceased, the remaining water mixture and compound is allowed to drain from the media. Once the media is drained, flocs (i.e., the flakes of precipitate formed by the reaction between the reactant and the sodium) and other particulate matter are washed from the media. In a configuration where the water mixture and precipitate are passed upwardly through a bed of media during the filtration process, flocs and other particulate matter are downwashed through the media. Once flocs and other particulate matter are washed from the media, they are handled and disposed of in a manner consistent with industry practice and governmental regulations.

Figure 3:
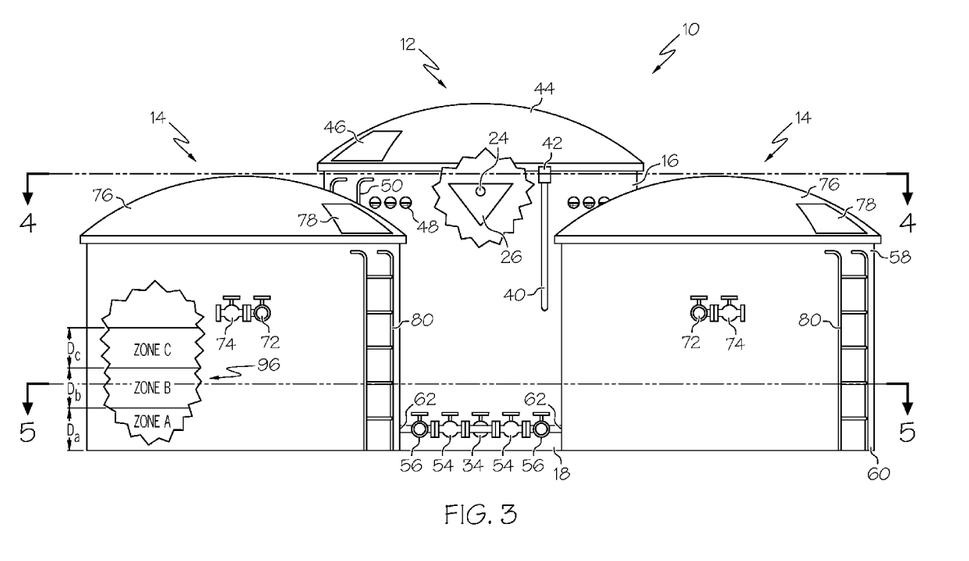
FIG. 3 is a side view of a water treatment system with portions broken away for illustrative purposes in accordance with one embodiment of the present invention.

FIGS. 3 though 6C show a water treatment system 10 that may be used to carry out the method described above. As illustrated in FIG. 3, the system 10 includes an aeration tank or vessel 12 and two filtration tanks or vessels 14. The aeration and filtration tanks 12 and 14 can be made of any suitable material, including polyethylene plastic or steel.

Raw water enters the system 10 via an entrance pipe 92 and exits via an exit pipe 94. When the system 10 is used to treat CBM water, the entrance pipe 92 is in fluid communication with the pump extracting the water from the underground coal seams.

Figure 4:
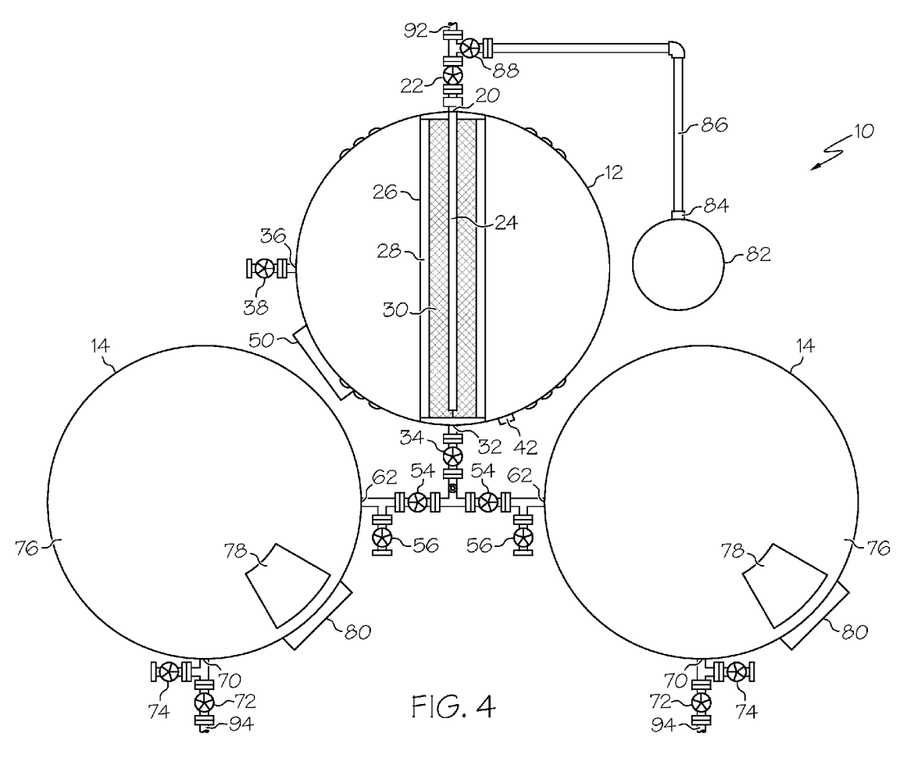
FIG. 4 is a top cross-sectional view of the water treatment system of FIG. 3 taken generally along line 4-4, in the direction of the arrows, in accordance with one embodiment of the present invention.

The entrance pipe may also be in fluid communication with a source of reactant. As shown in FIG. 4, the system 10 includes a tank or vessel 82 for storing a supply of a liquid or slurry reactant, such as magnesium hydroxide. In this embodiment, the reactant is injected into the raw water prior to the raw water entering the aeration tank 12. The reactant tank 82 is coupled with a metering pump 84 for regulating the amount of reactant that is injected into the water. Because magnesium hydroxide is generally in slurry form, the pump 84 should be capable of impelling highly viscous fluids. The tank 82 and pump 84 are connected to the entrance pipe 92 via a line 86 that can include a valve 88.

Once in the system 10, the water enters the aeration tank 12 at an inlet port 20. The aeration tank 12 has an upper end 16 and a lower end 18. As shown, the inlet port 20 is proximate the aeration tank's upper end 16. In one embodiment, the aeration tank includes a spray arm 24 that begins just inside of the inlet port 20 and runs substantially across the entire diameter of the aeration tank 12. The spray arm 24 is used to aerate the water and can be constructed from a polyvinyl chloride (PVC) pipe that includes outlets (not shown) located along substantially the entire length of its bottom portion. As mentioned above, the water can be aerated using one or more of a variety of techniques, including cascading it over a screen or injecting it from a high pressure nozzle. The outlets in the spray arm 24 can be apertures that are simply drilled into the spray arm 24 for cascading the water over a screen 30 or can include threads for receiving nozzles.

As illustrated in FIGS. 3 and 4, the aeration tank 12 includes a v-shaped tray 26 located below the spray arm 24 proximate the tank's upper end 16. The v-shaped tray 26 can be made of stainless steel and has a frame portion 28 and a screen portion 30. In an embodiment where a solid reactant, such as magnesium oxide, is used to treat the water, that solid reactant may be in granular form and contained within the tray 26. As the water exits the spray arm 24, it is sprayed, cascaded or poured over the solid reactant held within the tray. As the water passes through the screen 30, it is broken into microdroplets as it falls to the lower end 18 of the aeration tank 12.

The lower end 18 of the aeration tank 12 can act as a holding reservoir where the water and reactant are allowed to further mix. As mentioned above, the reactant combines with the sodium in the water to form a compound that can be filtered from the water. The lower end 18 of the aeration tank 12 has an outlet port 32 and valve 34 where the water mixture and compound exit the tank 12. The outlet port 32 of the aeration tank 12 is in fluid communication with the inlet port 62 of a filtration tank 16.

The system 10 can have one or more filtration tanks 14. The filtration tanks have upper and lower ends 58, 60 and contain media for filtering compounds, iron and other particulate matter from the water. The filtration tanks 14 shown in the figures are upflow filtration tanks 14 and, therefore, have inlet ports 62 proximate their lower ends 60 for feeding the water and compound into the tanks 14. However, it will be understood by one skilled in the art that the filtration tanks 14 may alternatively be of the downflow type.

Figure 5:
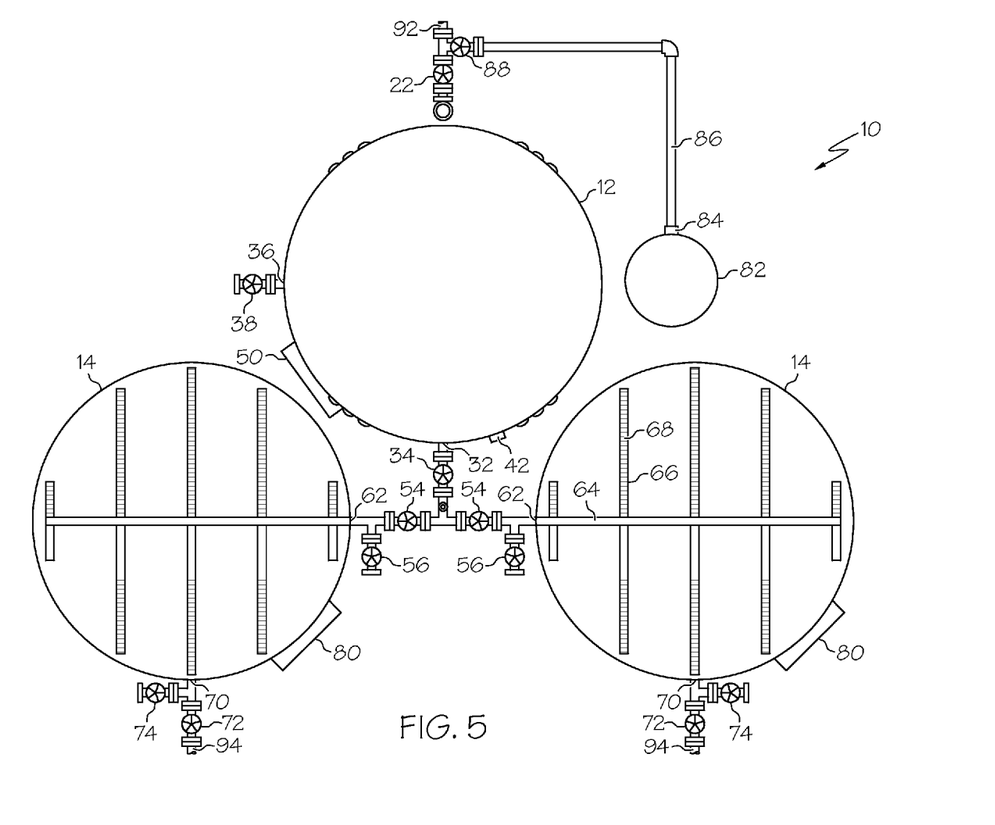
FIG. 5 is a top cross-sectional view of the water treatment system of FIG. 3 taken generally along line 5-5, in the direction of the arrows, in accordance with one embodiment of the present invention.

As illustrated in FIG. 5, the each filtration tank 14 has a manifold pipe 64 in fluid communication with the inlet port 62. The manifold pipe 64 is connected to a plurality of distribution pipes 66 having slots 68 for distributing the water and compound generally uniformly across the cross sectional area of the tank 14. The manifold pipe 64 and distribution pipes 66 may be constructed from PVC.

As illustrated in FIG. 3, the filtration tanks 14 contain a bed of media 96. Upon exiting the distribution pipes 66 via their slots 68, the water mixture and compound flow upwardly though the bed of media 14 towards an outlet port 70. The bed of media 96 may contain sand, gravel, clay, perlite, plastic manufactured beads, combinations thereof, or any other substance suitable for filtering the water. In one embodiment, the bed of media 96 consists of media of various sizes that is layered according to size. For example, in an upflow-type filtration tank, the bed 96 can contain a bottom layer or zone (Zone A) composed of gravel approximately 1.5 inches in size and having a depth $D_A$, a middle layer or zone (Zone B) composed of gravel approximately 1.0 inches in size and having a depth $D_B$, and a top layer or zone (Zone C) composed of gravel approximately 0.375 inches in size and having a depth $D_C$. While depths $D_A$, $D_B$, and $D_C$ can vary from one another, in one embodiment they are substantially equal. While FIG. 3 shows a bed of media 96 having three layers or zones, it is understood that the bed of media 96 may contain any number of layers or zones.

The filtration tank 14 includes an outlet port 70 that can be located between the tank's upper and lower ends 58, 60. As shown in FIG. 3, the outlet port 70 of the filtration tank 14 is located beneath the inlet port 20 of the aeration tank 12. This allows the water to be gravity-fed through the system 10.

Once the treated water is discharged from the filtration tank outlet port 70, it can be used locally, piped to another area, or released to flow downstream. The treated water can be used to irrigate crops or other vegetation, used to water livestock, released in streams, rivers, or reservoirs, or used for any other purpose for which such water is appropriate. It can also undergo further treatment (if necessary) to make it consumable by humans.

As shown in the figures, the tanks 12 and 14 also contain roofs 44 and 76 with inspection panels 46 and 78 that can be accessed by using ladders 50 and 80. The aeration tank 12 also has screened air vents 48 that assist in ventilating the gases removed from the water.

During most of its operation, the system 10 will maintain a water level in the aeration tank 12 at or slightly above the level of the filtration tank outlet 70. However, as flocs, and particulate material accumulate in the media, headloss increases in the system 10. This headloss increase causes the water level in the aeration tank 12 to become higher than the water level in the filtration tank 14.

The aeration tank 12 can include a site tube 40 for viewing the level of the water within the tank 12. The tank 12 may also contain a depth transponder 42 for transmitting the water level to a satellite or radio transmitting unit for remote monitoring by radio or internet via satellite. Monitoring of the water level in the tank 12, which can occur either visually or remotely, determines the system's 10 maintenance intervals, which may be on an approximate bimonthly basis.

When the water in the aeration tank 12 reaches a predetermined level (e.g. two feet above the filtration tank outlet port 70), a maintenance or cleaning cycle is initiated. The cleaning process can be done manually or can be entirely automated. The first steps in the cleaning cycle are to shutoff the metering pump 84 and close the aeration tank inlet valve 22. Next, the shutoff valves 54 located between the aeration tank 12 and filtration tanks 14 are closed. The downwash valves 56 are then opened and the water in the filtration tanks 14 is allowed to completely drain, taking with it the accumulated precipitates, flocs, and particulate matter.

When the filtration tanks 14 are empty, the downwash valves 56 are closed and the shutoff valves 54 are opened. At that point, the filtration tanks' outlet valves 72 are closed and the rinse valves 74 are opened. The filtration tanks 14 are allowed to fill with water and the water is diverted through the rinse valves 74 until the water is satisfactorily clean. The rinse valves 74 are then closed, the outlet valves 72 are re-opened, and the system is returned to service.

At some point when the accumulated compounds, flocs, and particulates accumulate and reach a depth of several feet, this accumulation can be drained off by opening the aeration tank drain valve 38, allowing the aeration tank 12 to empty via a drain outlet port 36. Once the aeration tank 12 is drained, the drain valve 38 is closed and the system can be returned to service.

Figure 6A:
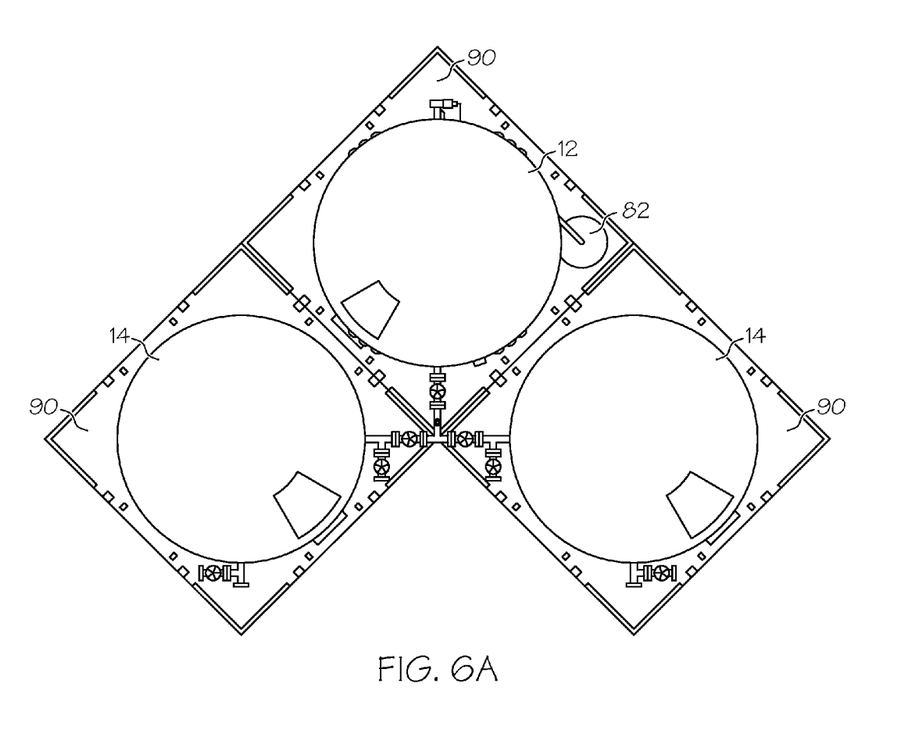
FIG. 6A is a top view of a water treatment system including an aeration tank and two filtration tanks placed on portable interlockable skids in accordance with one embodiment of the present invention.
Figure 6B:
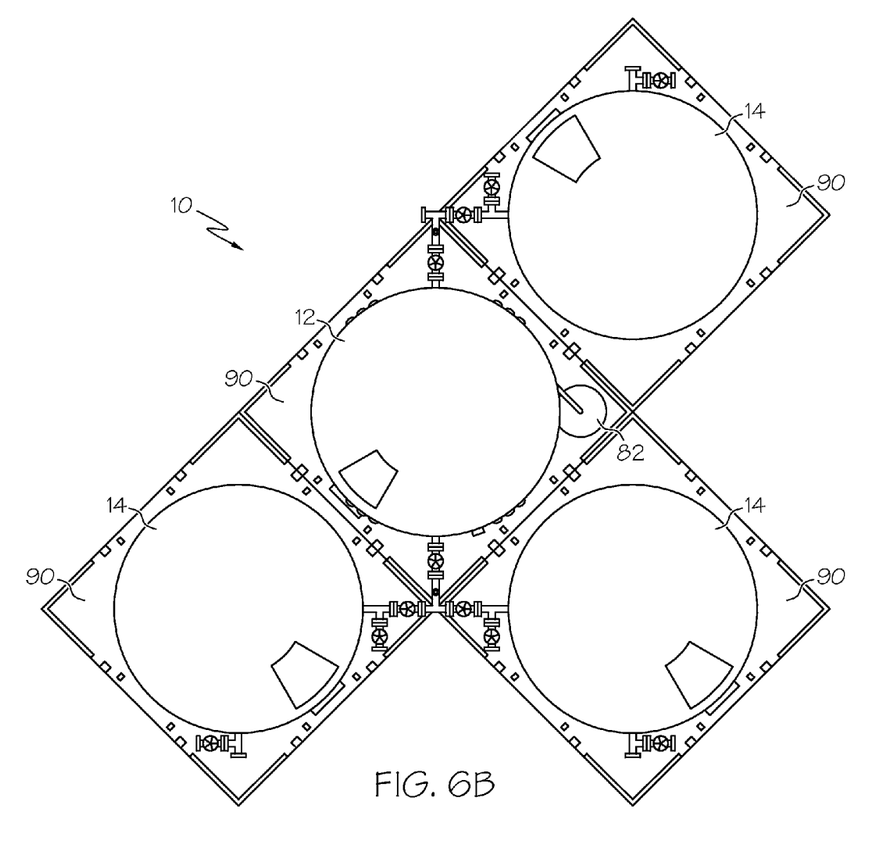
FIG. 6B is a top view of a water treatment system including an aeration tank and three filtration tanks placed on portable interlockable skids in accordance with one embodiment of the present invention.
Figure 6C:
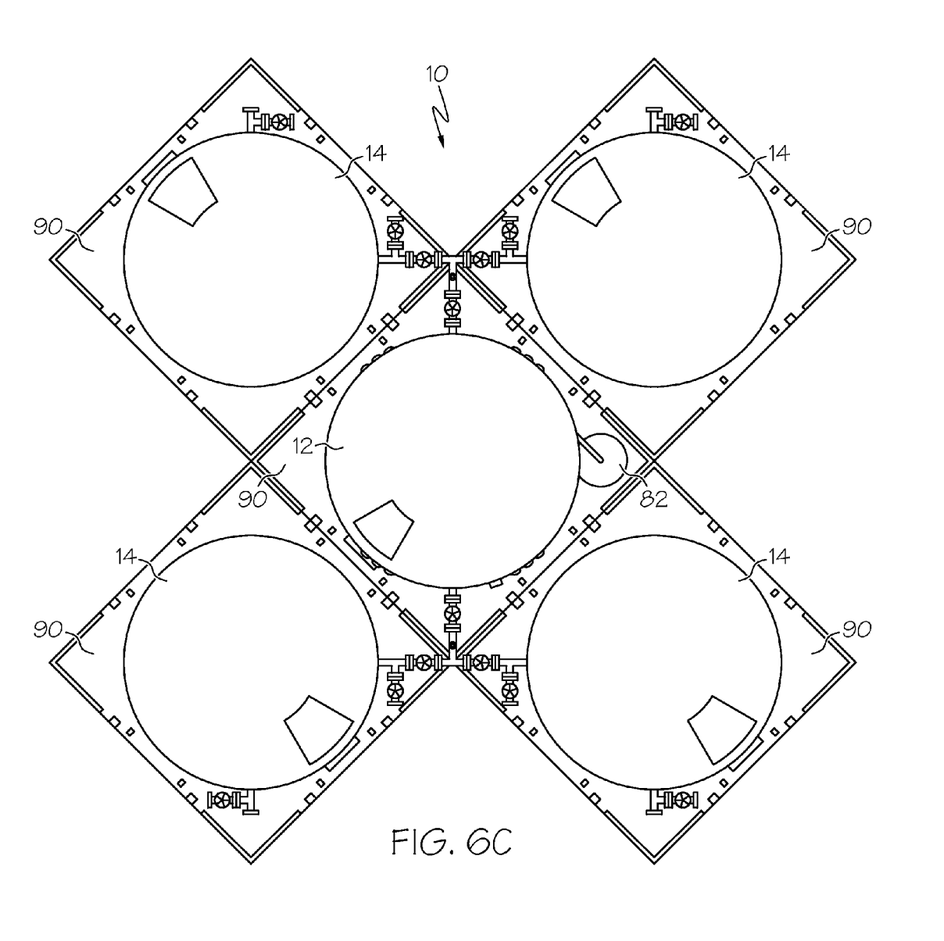
FIG. 6C is a top view of a water treatment system including an aeration tank and four filtration tanks placed on portable interlockable skids in accordance with one embodiment of the present invention.

The tanks 12, 14 and 82 can vary in size depending upon factors such as the capacity required at a specific location and the need to transport the tanks. In one embodiment, the tanks 12, 14, 82 are mounted on skids or pallets 90 such that they create a modular system 10 that can be easily transported. The skids 90 shown in FIGS. 6A-6C are interlockable and interchangeable and can be snapped, pinned, or bolted together in a configuration to form a system 10. In cases where the system 10 is designed to be readily transportable, using perlite or manufactured plastic beads as the filtering media, as opposed to sand or gravel, dramatically reduces the weight of system 10, thereby making it more transportable. In such a case, the perlite or plastic bead media can be loaded into the filtration tanks 14 prior to transport.

As mentioned above, depending upon certain factors, the tanks can vary in size from one system 10 to the next. In one embodiment of the system 10 configured to be transported on skids 90, the aeration tank 12 is approximately nine feet in diameter and eight feet tall. The same embodiment includes two filtration tanks 14 that are approximately nine feet in diameter and six feet tall. The capacity of such an embodiment varies depending upon the filtration rate of the media within the filtration tanks 14. The filtration flow rate of the media can vary between approximately 0.01 and 1.0 gallons per minute per square foot ($gpm/ft^2$). With a flow rate of 0.4 $gpm/ft^2$, a system 10 have two filtration tanks 14 of nine foot diameter (total filtration area of 127.2 $ft^2$), will have a flow rate of approximately 50 gpm or approximately 72,000 gallons per day.

Example

A series of laboratory bench-scale tests were conducted using samples of raw CBM water pumped from underground coal seams in the Powder River Basin area of northeastern Wyoming. During the tests, 1.24 mL of magnesium hydroxide ($Mg(OH)_2$) was added to every 400 mL of raw sample water and passed through an iron filter test stand. Five gallons of raw water was tested over approximately a five hour period of time.

The raw water, prior to treatment had a sodium concentration of 625 mg/L and a combined magnesium and calcium concentration of 10 mg/L. Therefore, the SAR of the raw water was approximately 47. The iron concentration of the raw sample water was approximately 1.0 mg/L, the total dissolved solids (TDS) concentration was 1610 parts per million (ppm), and the alkalinity was 1350.

After adding the magnesium hydroxide and passing the water and compounds through the iron filter test stand, the water had a sodium concentration of 296 mg/L and a combined magnesium and calcium concentration of 160 mg/L. Therefore, the SAR of the raw water dropped to approximately 5. The iron concentration of the treated water was approximately 0.1 mg/L, the TDS concentration was 1420 ppm, and the alkalinity was 1200.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Embodiment with Slow Sand Filter

The water treatment system 10 may optionally include a slow sand filter (not shown) in fluid communication therewith. The sand filter may be connected "upstream" from the system's aeration tank 12, such that it discharges into pipe 92. Alternatively, the sand filter may be connected "downstream" from the system's tank(s), such that it is in communication with pipe 94.

Over time as the water mixture passes through the sand, schmutzdecke forms on the surface of the sand. In a configuration where the water mixture passes upwardly through the bed of sand, the schmutzdecke layer forms on the bottom surface of the bed. The schmutzdecke layer traps particles of foreign matter and further enhances the filtration of the sand. While the composition of the schmutzdecke layer may vary, it will typically consist of a gelatinous biofilm matrix of bacteria, fungi, protozoa, rotifera and a range of aquatic insect larvae.

Depending upon the conditions, it can take between two and 20 days to form a layer of schmutzdecke. In such a case, it may become necessary to re-circulate the output water from the sand filter back through the sand to allow schmutzdecke to sufficiently form. Alternatively, in order to give the sand immediate effective filtering properties or accelerate the schmutzdecke's formation, the bed of sand may be "pre-coated" with a substance, such as an activated carbon and molasses.

Embodiment with Cation Exchange Equipment

Figure 7:
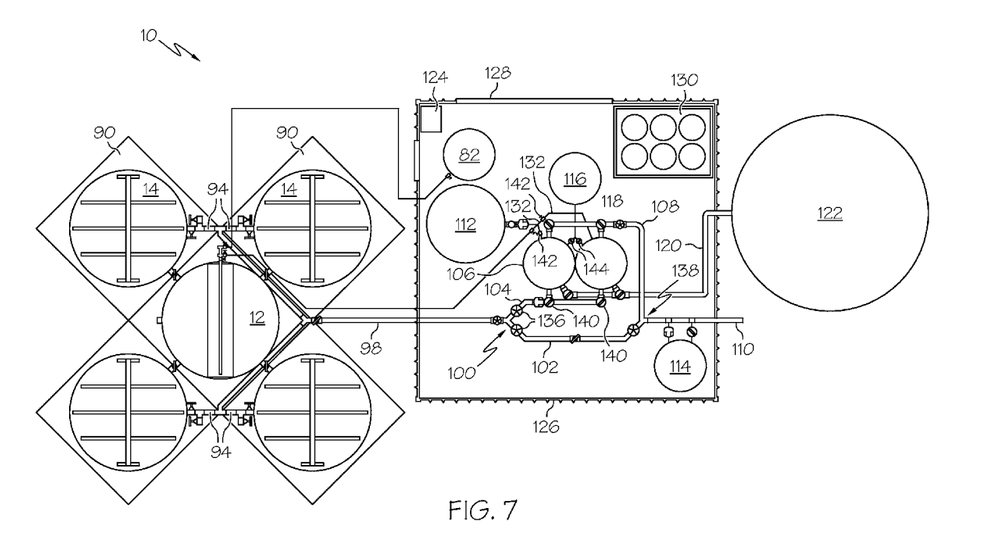
FIG. 7 is a perspective view of a water treatment system that includes equipment for facilitating a cation exchange process in accordance with one embodiment of the present invention.

In order to further reduce sodium levels within the water, the system 10 may include additional equipment, as shown in FIG. 7, for facilitating a cation exchange process. During the cation exchange, the water passes through an ion exchange resin bed. The sodium ions in the water are exchanged with hydrogen ions present on the resin. It should be understood that the additional cation exchange equipment, as shown in FIG. 7, and the cation exchange process that occurs therein may either be utilized in combination with or independently and separately from the precipitation and filtration equipment and process shown in FIGS. 1-6C.

The ion exchange resin is a strong acid cation resin, or alternatively, a weak acid cation resin, or even a combination of the two. The resin can be in the form of small-diameter manufactured plastic beads having diameters, for example, on the magnitude of about 1-3 mm. Acids used in the resin bed can include hydrochloric acid, acetic acid, carbonic acid, and citric acid. Upon the water passing through the resin and undergoing the cation exchange, it can optionally be treated with magnesium oxide in order to balance the water's SAR.

Periodically, as described below, the ion exchange resin needs to be recharged in order to restore the hydrogen ion content of the resin. The hydrogen ions are recharged by washing the resin with an acid (e.g. hydrochloric acid, acetic acid, carbonic acid, or citric acid). The resin is then rinsed with a solution in order to remove the resulting brine from the resin.

As illustrated in FIG. 7, the system 10 includes a pipe 98 that is in fluid communication with the exit pipes 94 of each of the filtration tanks 14. The pipe 98 terminates in a junction 100, where the flow of the water can be split into two separate streams. As shown, the junction 100 is a "Y" junction and splits the water flow between pipes 102 and 104. The water flowing through pipe 104 undergoes the cation exchange, while the water flowing through pipe 102 does not. The water flowing through both of these pipes 102 and 104 is eventually reconsolidated at location 138. Upon being reconsolidated at 138, the water is then discharged from the system through pipe 110.

Pipes 102 and 104 include flow control valves 136 for controlling the amount of water flowing through each pipe. Depending upon the water conditions and other circumstances, an operator may desire that a larger percentage or smaller percentage of the water to undergo the cation exchange. Such an adjustment can be made by adjusting the valves 136. In some cases, the operator may desire that either all or none of the water undergo the cation exchange. Again, such an adjustment can be made by adjusting the valves 136.

Water passing through pipe 104 will enter a tank 106 containing the ion exchange resin, where the water will undergo the cation exchange. As shown in FIG. 7, the system 10 may include two resin tanks 106. While the tanks 106 may be used simultaneously, normally one tank 106 is in operation while the other tank 106 is taken off-line to undergo resin recharge. Valves 140 are provided to control the flow of the water through each tank 106. Upon exiting the tanks 106, the water is fed through pipe 108 to the junction at 138 where is reconsolidated with the water that did not undergo the cation exchange.

As mentioned above, the resin within the tanks 106 needs to be periodically recharged. This recharge is normally required every eight hours or so in order for the cation exchange to continue effectively. During the recharge process, the resin is washed with an acid (e.g. hydrochloric acid, acetic acid, carbonic acid, or citric acid) which is contained within tank 112. Once one of the tanks 106 being taken off-line, a valve 142 in line 132 is opened and the acid is introduced into the tank 106. Upon the resin being washed with acid and valve 142 being closed, a valve 144 in line 118 is opened. This permits the rinse solution, which is contained in tank 116 to be introduced into the tank 106 to remove the resulting brine. The rinse solution, acid and brine exit the tank 106 via line 120 and are discharged into an evaporative tank 122. Upon the resin within the tank 106 being recharged, the tank 106 can be put back on-line. This recharge process can be completely automatic through the use of automated valves and controls or can be controlled manually.

Prior to exiting the system 10, magnesium hydroxide may be added to the water in order to balance the water's SAR. The magnesium hydroxide is contained in tank 114. The magnesium can also be introduced to the water in its dry, solid form (magnesium oxide).

The equipment and valving controlling the cation exchange process, the resin recharging process, as well as the percentage of water undergoing the cation exchange process can be fully automated. Such a fully automated embodiment includes controls 124 for initiating the proper sequences and making the desired adjustments.

As demonstrated in FIG. 7, the system 10 includes a building 126 that encloses the equipment used in the cation exchange process. To facilitate maintenance of the system, the building may include an overhead door 128 (i.e. garage-type door) and a storage area 130.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A liquid filtration system, comprising:
   a first vessel including
      upper and lower ends,
      an inlet proximate said upper end for feeding liquid into said first vessel, wherein said inlet is in fluid communication with a spray arm for aerating said liquid and a source of reactant formulated for at least partially removing sodium from said liquid through adsorption, and
      an outlet proximate said lower end; and
   a second vessel including
      upper and lower ends,
      an inlet for receiving liquid from said first vessel outlet and feeding liquid into said second vessel proximate its lower end, wherein said inlet is in fluid communication with a distribution pipe for dispersing liquid within said second vessel,
      media within said second vessel for separating compounds from said liquid, and
      an outlet for removing treated liquid.

2. The liquid filtration system of claim 1 wherein first vessel further includes a screen underneath said spray arm for breaking said liquid into microdroplets as said liquid passes through said screen.

3. The liquid filtration system of claim 1 further comprising a third vessel for containing said source of reactant.

4. The liquid filtration system of claim 1 wherein said reactant is selected from a group consisting of acetic acid, magnesium hydroxide, magnesium oxide, magnesium sulfate, gypsum, lime, calcite and combinations thereof.

5. The liquid filtration system of claim 1 wherein said first and second vessels are placed on portable skids.

6. The system of claim 1 wherein said media is selected from a group consisting of sand, gravel, clay, and manufactured plastic beads.

7. The system of claim 1 wherein said media is perlite.

* * * * *